(12) United States Patent
Komandoor Elayavilli (10) Patent No.: US 9,576,135 B1
(45) Date of Patent: Feb. 21, 2017

(54) PROFILING USER BEHAVIOR THROUGH BIOMETRIC IDENTIFIERS

(71) Applicant: Amazon Technologies, Inc., Reno, NV (US)

(72) Inventor: Smitha Komandoor Elayavilli, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/196,334

(22) Filed: Mar. 4, 2014

(51) Int. Cl.
*G06F 21/00* (2013.01)
*G06F 21/60* (2013.01)
*G06F 21/32* (2013.01)

(52) U.S. Cl.
CPC .............. *G06F 21/60* (2013.01); *G06F 21/32* (2013.01)

(58) Field of Classification Search
CPC ..... G06F 21/32; G06F 21/60; G06K 9/00288; H04L 9/3231; H04L 63/0861; H04L 63/083
USPC .......................................................... 726/28
See application file for complete search history.

(56) References Cited

U.S. PATENT DOCUMENTS

| | | | |
|---|---|---|---|
| 9,270,918 B2* | 2/2016 | Lee ..................... | H04N 5/44543 |
| 2009/0271826 A1* | 10/2009 | Lee ..................... | H04N 5/44543 |
| | | | 725/46 |
| 2009/0328175 A1* | 12/2009 | Shuster .................. | G06F 21/36 |
| | | | 726/7 |
| 2011/0055934 A1* | 3/2011 | Koka et al. ...................... | 726/28 |
| 2011/0135168 A1* | 6/2011 | Hosoi ............................ | 382/118 |
| 2011/0145149 A1* | 6/2011 | Valdes .................... | G06Q 20/10 |
| | | | 705/44 |
| 2012/0121140 A1* | 5/2012 | Gerken, III .................... | 382/115 |
| 2012/0330756 A1* | 12/2012 | Morris ................... | G06Q 50/01 |
| | | | 705/14.66 |
| 2013/0018730 A1* | 1/2013 | Morris ............... | G06Q 30/0251 |
| | | | 705/14.61 |
| 2013/0073473 A1* | 3/2013 | Heath .................... | G06Q 30/02 |
| | | | 705/319 |
| 2013/0160111 A1* | 6/2013 | Orr ................................ | 726/19 |
| 2013/0291093 A1* | 10/2013 | Matsuoka ....................... | 726/19 |
| 2014/0006795 A1* | 1/2014 | Han et al. ...................... | 713/186 |
| 2014/0075385 A1* | 3/2014 | Wan et al. ..................... | 715/812 |
| 2014/0181959 A1* | 6/2014 | Li et al. .......................... | 726/19 |
| 2015/0249913 A1* | 9/2015 | Hua et al. ..................... | 455/41.2 |

* cited by examiner

*Primary Examiner* — Don Zhao
(74) *Attorney, Agent, or Firm* — Sutherland Asbill & Brennan LLP (57) ABSTRACT

This disclosure describes systems and methods for profiling user behavior through biometric identifiers. A first biometric identifier associated with a first user of a user device may be captured. The first user may be identified based at least in part on the first biometric identifier. The first request for content and first information retrieved from the user profile may be transmitted. First data that corresponds to the first request for content may be received. A second biometric identifier associated with a second user of the user device may be captured during an active session associated with the first user profile. The second user may be identified based at least in part on the second biometric identifier. A second request for content and second information retrieved from the second user profile may be transmitted. A second data corresponding to the second request for content may be received.

18 Claims, 4 Drawing Sheets

PROFILING USER BEHAVIOR THROUGH BIOMETRIC IDENTIFIERS

BACKGROUND

User devices, such as phones and tablets, have become increasingly mobile and have an increased capability to be connected to the Internet from many different places. Applications and websites make it easy for people to create user accounts and store payment information in association with the user accounts. In many instances, users are able to remain signed into the user accounts from different websites and/or applications without the need to sign in every time. In such scenarios, users are vulnerable to having their personal information and/or financial information exposed to unauthorized third parties.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques and methodologies for profiling user behavior through biometric identifiers. Biometrics may refer to the identification of people based at least in part on their physical characteristics or traits. Biometrics may be used as a form of identification and/or access control. Biometric identifiers may be measurable characteristics used to identify individuals. Examples of biometric identifiers may include, but are not limited to, fingerprints, face recognition, DNA, palm print, hand geometry, iris recognition, retina scans, and/or scent. Behavioral characteristics may be related to the pattern of behavior of a person, including but not limited to: typing rhythm, gait, and voice.

User devices may be equipped with different types of sensors that may capture different types of biometric identifiers. User devices may be equipped with microphones, which may capture voice recordings, one or more cameras which may be used for facial recognition, hand geometry recognition, facial recognition, and the like, and/or fingerprint scanners to capture fingerprints of a user.

In an illustrative example, Bob may have a tablet that he uses to purchase and watch movies or shop online. Bob may have set up his user account and tablet so that when he begins using the tablet, the tablet captures biometric identifiers that may be used to identify and/or authenticate Bob as the user of the tablet and may permit Bob to log into a user account. The tablet may capture behavioral information, such as the viewing and/or purchase history of content Bob may wish to acquire and watch. The tablet may also capture the types of applications Bob uses and the duration of the usage. The tablet may transmit the captured behavioral information to a server, where the data may be analyzed and behavioral patterns may be identified. The server may then associate and/or augment Bob's user account with the behavioral patterns, which may enable the server to provide more customized recommendations and/or customize service to Bob based on his implicit preferences as derived from the behavioral patterns.

Furthering the example, Jason may wish to use Bob's tablet to identify content that he wants to watch. The tablet may capture biometric identifiers associated with Jason as he uses the tablet and determine that Jason is not Bob. Responsive to such a determination, Bob's information may be safeguarded by logging out of any user accounts and shielding any personal information from Jason. The tablet may then determine whether Jason has a user account based at least in part on his biometric identifiers. If he does have a user account, Jason may be logged into the websites and/or applications and information associated with Jason may be retrieved and displayed. The tablet may capture behavioral information associated with Jason, which may be used to augment and/or update Jason's user account.

If Jason did not have a user account, the tablet may capture biometric identifiers and/or behavioral information and store them locally. The tablet may ask Jason whether he wanted to create a user account. If Jason wanted to create a user account, the biometric identifiers and/or behavioral information may be transmitted to a server and associated with the newly created user account for Jason. If Jason did not want to create a user account, the biometric identifiers and/or behavioral information captured in association with Jason may be discarded by the tablet.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
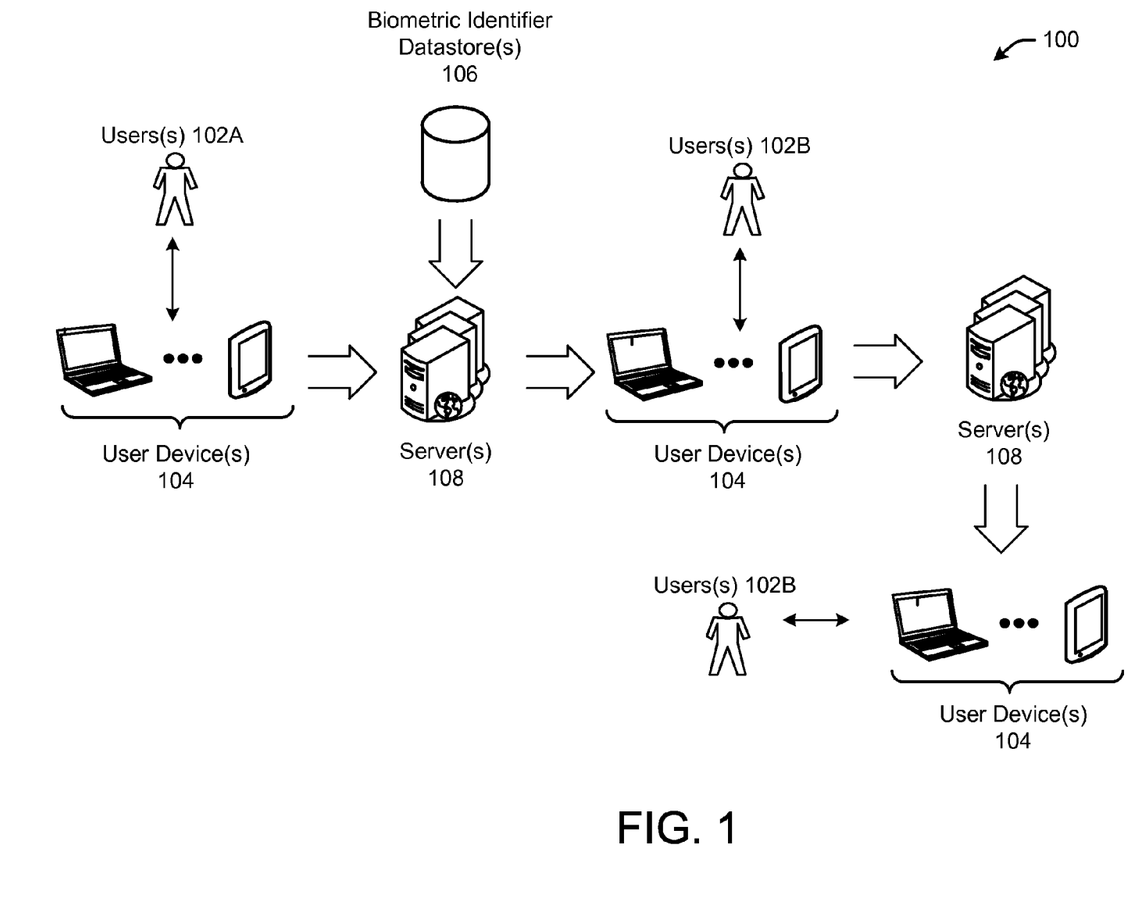
FIG. 1 depicts an illustrative data flow between various components of an illustrative system architecture for profiling user behavior through biometric identifiers in accordance with one or more embodiments of the disclosure.

FIG. 1 depicts an illustrative data flow between various components of an illustrative system architecture for profiling user behaviors through biometric identifiers in accordance with one or more embodiments of the disclosure. One or more illustrative user device(s) 104 operable by one or more users 102 are illustratively depicted in FIG. 1 The user device(s) 104 may include any suitable device capable of executing applications, receiving and transmitting data with other computing devices, and capturing biometric identifiers. The user device(s) 104 may include any suitable processor-driven computing device including, but not limited to, a laptop computing device, a tablet device, a desktop computing device, smartphone or other cellular device, a gaming console, a multimedia content streaming device, a set-top box, and so forth. For ease of explanation, the user device(s) 104 and the user(s) 102 may be described herein in the singular; however, it should be appreciated that multiple user device(s) 104 operable by multiple users 102 may be provided.

In an example embodiment, a user 102A may interact with a user device 104. The first user 102A may browse the Internet or execute applications. During the course of the interacting with the user device, the user device 104 may capture biometric identifiers associated with the user 102A. The biometric identifiers associated with the user 102A may be transmitted to one or more servers 108. The servers 108 may identify whether the user 102A is associated with a user account, based at least in part on the captured biometric identifiers. In some embodiments, the identification and/or authentication may be made based at least in part on data retrieved from one or more biometric identifier datastore(s) 106. The user 102A may have a user account and data associated with the user account, such as preferences, may be retrieved by the server 108. The user 102A may request content and responsive to the request, the server may retrieve content and customize and/or modify the set of retrieved content based at least in part on retrieved information associated with the user account.

The requested content may be transmitted to the user device 104 for presentation to the user 102A. A second user 102B may then start interacting with the user device 104. The tablet may log out of user accounts associated with the first user 102A and obscure any personally identifying information associated with the first user 102A to prevent the second user 102B from viewing such data.

As the second user 102B interacts with the user device 104, the user device 104 may capture biometric identifiers associated with the second user 102B and transmit the captured biometric identifiers to the one or more server(s) 108 to determine whether the second user 102B is associated with a second user account. The server 108 may determine the second user is not associated with any user account. The user 102B may have requested content from the server 108, which the server 108 may retrieve and transmit to the user device 104 for presentation to the second user 102B.

Figure 2:
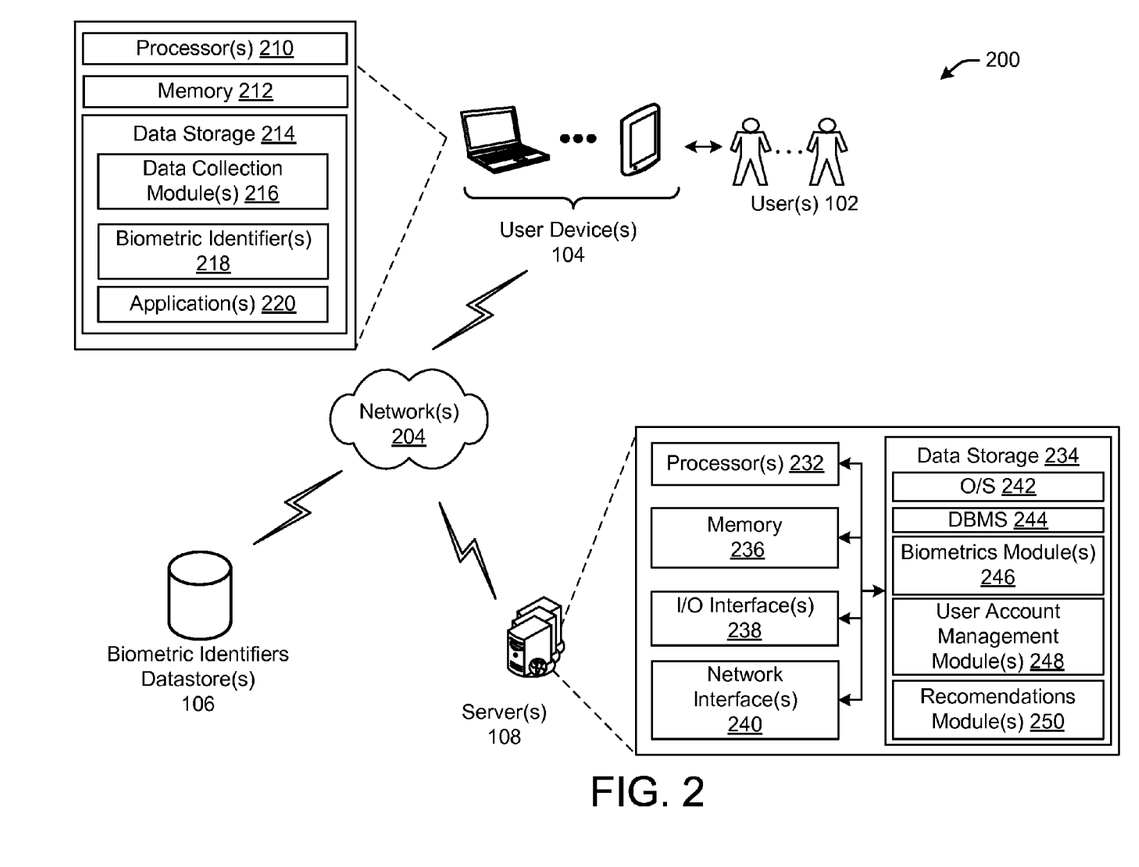
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more user device(s) 104 operable by one or more users 102, one or more biometric identifiers datastore(s) 106, and/or one or more server(s) 108. The user device(s) 104, biometric identifiers datastore(s) 106, and/or server(s) 108 may include any of the types of devices described through reference to FIG. 1.

Any of the user device(s) 104, biometric identifiers datastore(s) 106, and/or server(s) 108 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user device(s) 104 may include one or more processor(s) 210 that may include any suitable processing unit capable of accepting digital data as input, processing the input data based on stored computer-executable instructions, and generating output data. The computer-executable instructions may be stored, for example, in the data storage 214 and may include, among other things, operating system software and application software. The computer-executable instructions may be retrieved from the data storage 214 and loaded into the memory 212 as needed for execution. The processor(s) 210 may be configured to execute the computer-executable instructions to cause various operations to be performed. The processor(s) 210 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 214 may store program instructions that are loadable and executable by the processor(s) 210, as well as data manipulated and generated by the processor(s) 210 during execution of the program instructions. The program instructions may be loaded into the memory 212 as needed for execution. Depending on the configuration and implementation of the user device(s) 104, the memory 212 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 212 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

Various program modules, applications, or the like may be stored in data storage 214 that may comprise computer-executable instructions that when executed by the processor(s) 210 cause various operations to be performed. The memory 212 may have loaded from the data storage 214 one or more operating systems (O/S) that may provide an interface between other application software (e.g., dedicated applications, a browser application, a web-based application, a distributed client-server application, etc.) executing on the user device 104 and the hardware resources of the user devices 104. More specifically, the O/S may include a set of computer-executable instructions for managing the hardware resources of the user devices 104 and for providing common services to other application programs (e.g., managing memory allocation among various application programs). The O/S may include any operating system now known or which may be developed in the future including, but not limited to, any mobile operating system, desktop or laptop operating system, mainframe operating system, or any other proprietary or open-source operating system.

The data storage 214 may additionally include various other program modules that may include computer-executable instructions for supporting a variety of associated functionality. For example, the data storage 214 may include one or more data collection module(s) 216, biometric identifiers 218, and/or application(s) 220.

The data collection module(s) 216 may include computer-executable instructions that in response to execution by the processor(s) 210 cause operations to be performed including obtaining biometric identifiers, such as fingerprints, voice recordings to be used for voice recognition, pictures to be used for facial recognition, and the like. The data collection module 216 may communicate with one or more sensors of the user device 104, such as a microphone, fingerprint reader, and/or one or more cameras associated with the user device, in order to capture the biometric identifiers. In some embodiments, the data collection module 216 may also capture actions of the user, such as selection of items, view times associated with the user viewing an item and/or content, browsing history, and the like. In some embodiments, the data collection module 216 may capture the biometric identifiers 218 via the sensors associated with the user device 104 during the course of normal usage by the user 102.

The biometric identifiers 218 may include data collected by the user device 104 via one or more sensors, such as a microphone, camera, and/or fingerprint reader and/or biometrics retrieved via the network 204 from the biometric identifiers datastore 106 and/or server(s) 108.

The application(s) 220 may include computer-executable instructions that in response to execution by the processor(s) 210 cause operations to be performed including any type of user application that a user 102 may utilize on the user device 104, such as a web browser. The application(s) 220 may be used to collect information, may utilize information collected by the data collection module 216, may use biometric identifiers 218, may generate one or more results based at least in part on information collected by the data collection module 316 or the biometric identifiers 218.

The biometric identifiers datastore(s) 106 may receive, store, and/or manipulate biometric identifiers 218 collected by data collection module(s) 216 of one or more user device(s) 104, where the biometric identifiers may be associated with different users 102. The biometric identifiers datastore(s) 106 may receive biometric identifiers from user device(s) 104 and/or server(s) 108.

The server(s) 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the server(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The server(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The server(s) 108 may further include network interface(s) 240 that facilitate communication between the server(s) 108 and other devices of the illustrative system architecture 200 (e.g., user device(s) 104, biometric identifiers datastore(s) 106 etc.) or application software via the network(s) 204. The server(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the server(s) 108 and the hardware resources of the server(s) 108. More specifically, the O/S 242 may include a set of computer-executable instructions for managing the hardware resources of the server(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more biometrics module(s) 246, one or more user account management module(s) 248, and/or one or more recommendation module(s) 250.

The one or more biometrics module(s) 246 may include computer-executable instructions that in response to execution by the processor(s) 232 cause operations to be performed including receiving biometric identifiers 218 associated with a user 102 from a user device 104 and determine whether the biometric identifiers 218 matches any biometric identifiers stored in the one or more biometric identifiers datastores 106. The biometrics module 246 may then generate a notification indicating either that the biometric identifiers 218 are associated with a user account or that the biometric identifiers 218 are not recognized.

The one or more user account management module(s) 248 may include computer-executable instructions that in response to execution by the processor(s) 232 cause operations to be performed including receiving a notification regarding the biometrics and whether the received biometric identifiers 218 is known in the system 200. If the biometric identifiers 218 is known in the system 200 (e.g., matches biometrics stored in one or more biometrics datastore(s) 106), the user account management module 248 may identify a user account associated with the biometric identifiers and retrieve information associated with the user account. The user account management module 248 may retrieve information, such as payment information, browsing history, preferences, and the like. In some embodiments, the user account management module 248 may receive a request from the user device 104 for content, such as digital content and/or information associated with products and/or services. Based at least in part on the user information associated with the user account, the user account management module 248 may retrieve data associated with and/or corresponding to the requested content and transmit the information to the requesting user device 104 for presentation to the user 102.

The one or more recommendation module(s) 250 may include computer-executable instructions that in response to execution by the processor(s) 232 cause operations to be performed including receiving or otherwise obtaining user account information from the user account management module 248 and/or user device(s) 104. The recommendation module 250 may generate recommendations for content and/or items based at least in part on the obtained user account information. The recommendation module 250 may transmit the recommendations to the user account management module 246 for presentation of the recommendations to the user 102 of the user device 104.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
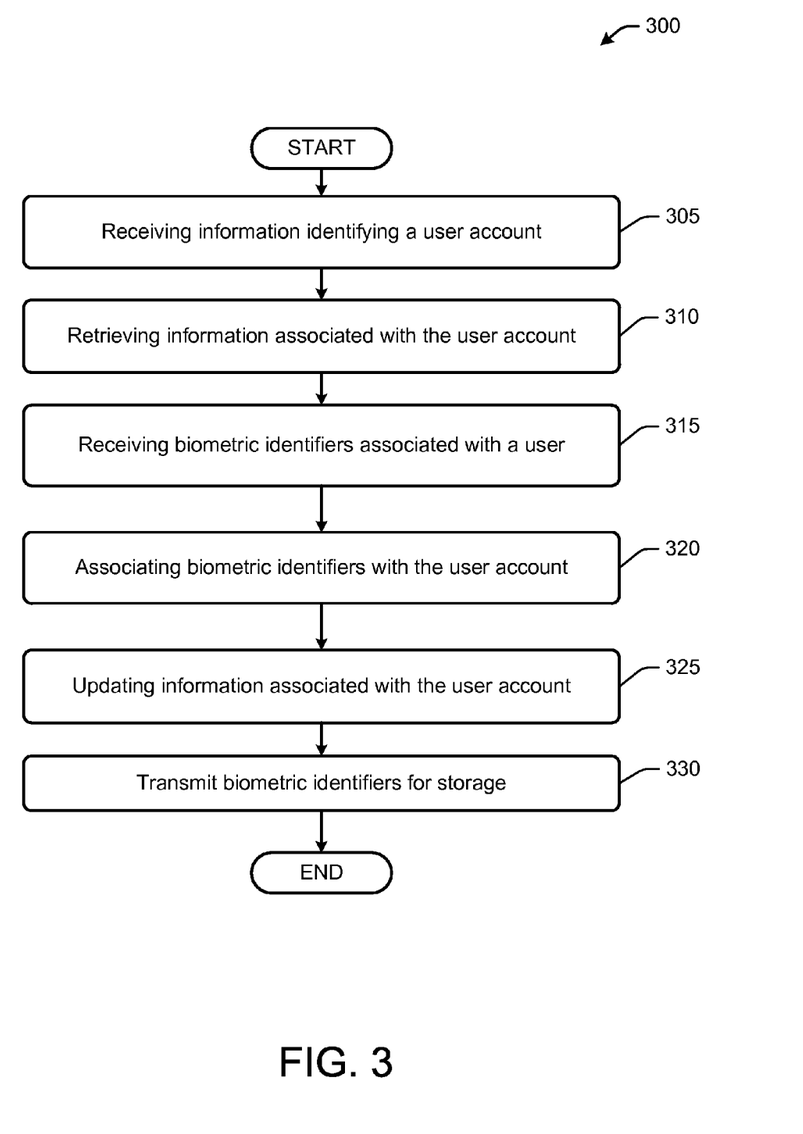
FIG. 3 is a process flow diagram of an illustrative method for associating biometric identifiers with a user account in accordance with one or more embodiments of the disclosure.

FIG. 3 is a process flow diagram of an illustrative method for associating biometric identifiers with a user account in accordance with one or more embodiments of the disclosure. At block 304, a server 108 may receive information identifying a user account. For example, a user 102 may have submitted authentication credentials, such as a username and password or an authentication token, associated with a user account or profile for authentication. The server 108 may authenticate the user 102 based at least in part on the authentication credentials.

At block 310, the server 108 may retrieve information associated with the user account. For example, the user account management module 248 of the server 108 may access and retrieve data associated with settings and/or preferences of the user account, such as contact information, payment information, order history information, specification of the types of content preferred by the user 102, and the like. In some embodiments, the user account management module 248 may retrieve preferences for biometric identifier authentication. If the user 102 enables the preference for biometric identifier authentication or the use of biometric identifiers in association with the user account or profile, user account management module 248 may request or instruct the user 102 to provide biometric identifiers via one or more sensors associated with the user device. For example, the user account management module 248 may generate and transmit a message to the user device 104 to request the user 102 to submit one or more biometric identifiers, such as a voice recording via a microphone, an image of the user's face via one or more cameras associated with the user device 104, and/or a fingerprint captured with a fingerprint reader associated with the user device 104. In some embodiments, the user account management module 248 may permit the user 102 to specify which of the biometric identifiers they wish to submit. In some embodiments, the user account management module 248 may direct the user device 104 to capture different types of biometric identifiers during the usage of the user device 104 by the user 102.

At block 315, the server 108 may receive biometric identifiers associated with a user 102. In some embodiments, the biometric module 246 may receive 218 the one or more biometric identifiers. The biometric module 246 may analyze and/or process the biometric identifiers to ensure they were captured properly by the user device 104. If the biometric identifiers were not captured properly, the biometric module 246 may communicate with the user device 104 to recapture the biometric identifiers.

In some embodiments, the biometric module 246 and/or the user account management module 248 may scan one or more biometric identifiers datastores 106 to determine whether the received biometric identifiers 218 are associated with an existing user account. If the biometric identifiers 218 are associated with an existing user account, the user account management module 248 may request verification from the user 102 whether the existing account belongs to the user 102. If so, the user account management module 248 may request to verify user 102 identification via security means, such as answering security questions or the like. If the user account management module 248 determines that the user 102 is the authorized user of the existing user account, the biometric module 246 may verify the biometric identifiers 218 that match those already associated with the account.

In some embodiments, the biometric module 246 and/or the user account management module 248 may determine that the received biometric identifiers are not currently associated with an existing user account and may request confirmation from the user 102 to associate the biometric identifiers 218 with the user account associated with the user 102.

At block 320, the server 108 may associate the biometrics 218 with the user account. In some embodiments, the biometric module 246 may maintain a table or other means of tracking to associate the stored biometric identifiers 218 with the identified user account associated with the user 102.

At block 325, the server 108 may update information associated with the user account. The user account management module 248 may update the data associated with the user account to reflect the association of the biometric identifiers 218 of the user 102 with the user account.

At block 330, the server 108 may transmit the biometric identifiers 218 for storage. In some embodiments, the biometric identifiers 218 may be transmitted to one or more biometric identifiers datastore(s) 106 by the biometric module 246 for storage.

In some embodiments, biometric identifiers 218 may be used in multiple contexts. For example, biometric identifiers 218 may be associated with an account local to a user device 104, where the biometric identifier 218 may be used to log into the user device 104. Biometric identifiers 218 may additionally be used for the purpose of logging into a network-based user account, such as a user account associated with an application or website. Different biometric identifiers 218 may be used in the different contexts or the same biometric identifiers 218 may be used for authentication to different accounts as the different contexts (e.g., local user device login, website login, application login, etc.) are disjointed and may not share authentication protocols or methodologies.

Figure 4:
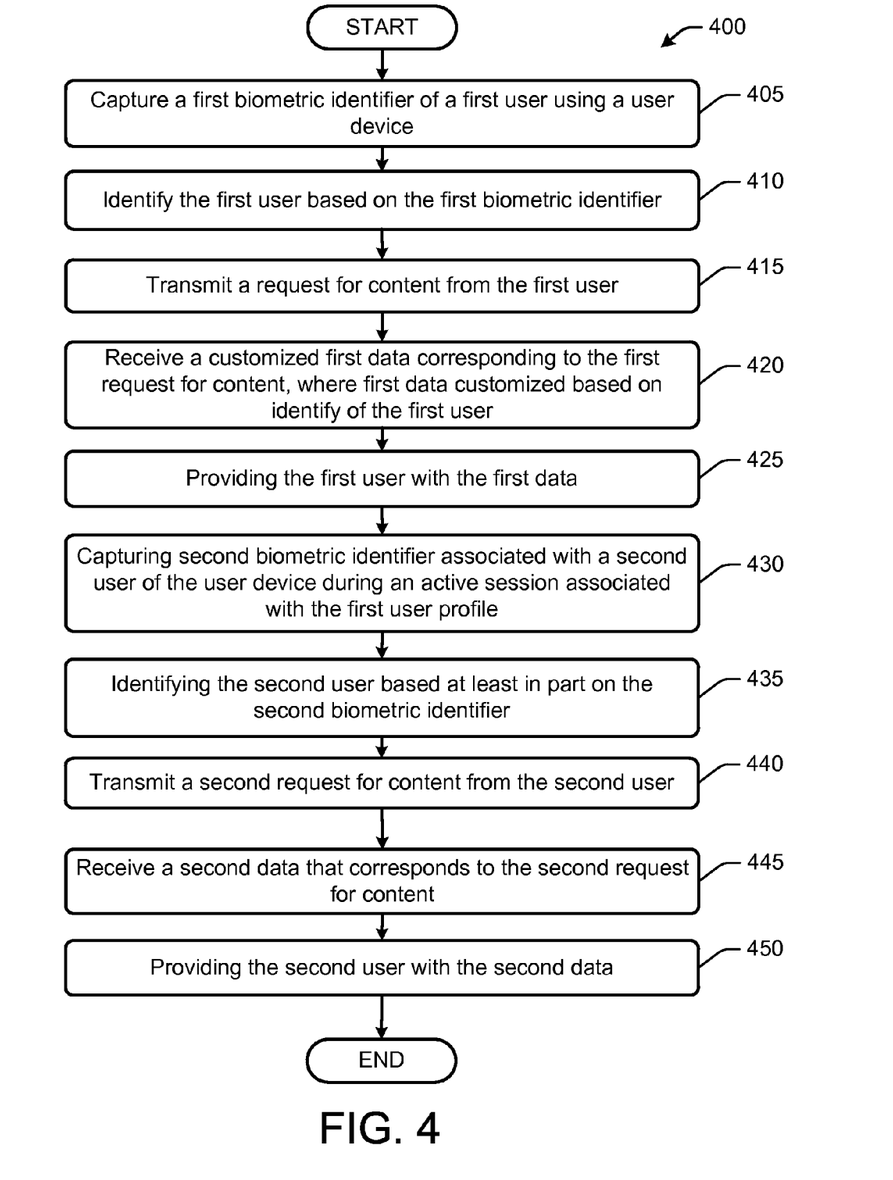
FIG. 4 is a process flow diagram of an illustrative method for profiling user behavior through biometric identifiers in accordance with one or more embodiments of the disclosure.

FIG. 4 is a process flow diagram of an illustrative method for profiling user behavior through biometric identifiers in accordance with one or more embodiments of the disclosure. At block 405, a data collection module 216 of the user device 104 may capture one or more biometric identifiers of a first user 102A using a user device 104. In some embodiments, sensors associated with the user device 104 may capture the biometric identifier 218 associated with the first user 102A during the usage of the user device 104 by the user 102A. For example, the data collection module 216 may capture an image of the user's face as they are using an application 220, such as a video chat application. The data collection module 216 may capture a voice recording as the user 102A is speaking either via an application 220 or to someone in close vicinity to the user 102A and the user device 104. In some embodiments, the data collection module 216 may capture fingerprints of the user 102A as they touch the touchscreen of the user device 104. In some embodiments, the biometric identifiers 218 may be captured by a user device 104 throughout the interaction of the user 102 and the user device 104. In some embodiments, the biometric identifiers 218 may be captured by a user device 104 at pre-defined time periods or responsive to pre-determined actions by the user 102.

At block 410, the user device 104 may identify the first user 102A based at least in part on the captured biometric identifier 218. In some embodiments, the user device 104 may compare the captured biometric identifier 218 to locally stored biometric identifiers 218. In some embodiments, the user device 104 may communicate with one or more server(s) 108 and transmit the captured biometric identifiers 218 for identification and/or authentication by the biometric module 246 of the server 108. The biometric module 246 and/or the user account management module 248 may retrieve information associated with the captured biometric identifier 218 and generate a notification to the user device 104. The notification may indicate that the biometric identifier 218 is associated with a user account associated with a first user 102A and may include information to identify and/or authenticate the first user on the user device 104. In some embodiments, the notification may indicate that the biometric identifier 218 is not associated with any existing user accounts.

In some embodiments, the biometric identifier 218 may be used to authenticate the user account on the user device 104, permitting the user 102A to access information, such as payment methods, on the user device 104 without needing to further provide authentication credentials. In some embodiments, the biometric identifier 218 may be transmitted to one or more server(s) 108 to authenticate the user account associated with the user device 104.

At block 415, the user device 104 may transmit a request for content from the first user 102. In some embodiments, the request for content may be access to digital content or request for information associated with a particular item or service. In some embodiments, the request for content may be transmitted to a server 108. In some embodiments, the request may be received by the user account management module 248.

At block 420, the user device 104 may receive a customized first data corresponding to the first request for content. In some embodiments, the user account management module 248 may retrieve content and/or associated information based at least in part on the received request for content. In some embodiments, the user account management module 248 may retrieve content based at least in part on the user preferences associated with the user account of the user 102A. For example, the request for content may have specified action movies. The user account management module 248 may query one or more content datastores to retrieve information associated with action movies. Additionally, the user account management module 248 may customize and/or modify the results of the query based at least in part on the identity of the user 102A. For example, the user 102A may have previously specified that they did not like foreign movies. In some embodiments, the preferences may have been determined based at least in part on past user behavior, such as a negative review given by the user 102A to any movies that starred a particular actor. The user account management module 248 may customize and/or modify the results of the query based on such preferences (e.g., explicitly specified by the user 102A and/or implicitly recognized by the server 108 based on previous behavior by the user 102A).

In some embodiments, the user account management module 248 may customize and/or modify the retrieved content corresponding to the request based at least in part on the identity of the user 102A based on one or more biometric identifiers 218 associated with the user 102A. For example, the biometric module 246 may determine that the one or more biometric identifiers associated with the user 102A indicate that the user 102A is a child, or a user profile associated with the biometric identifier may indicate the age of the user 102A. The user account management module 248 may customize the retrieved content to exclude content inappropriate for the age of the user 102A. In some embodiments, the user profile may include demographic information about or associated with the user and/or an identifier associated with a user. In some embodiments, the user account management module 248 may customize the additional or secondary content to be presented with the customized content based on the identity of the user. Examples of additional content may include advertisements and/or recommendations for other content. For example, the customized content may include a specific movie. The additional or secondary content may include advertisements or recommendations of content customized and appropriate to be presented to the user according to the age of the user.

In another embodiment, the biometric module 246 may determine that a biometric identifier 218 associated with a user 102A indicates that the user is an adult male. For example, a voice recording of the user 102A may be analyzed to determine the user 102A is an adult male. The content retrieved corresponding to the request may be customized and/or modified to include recommendations for an adult male. In some embodiments, the secondary or additional content may also be customized based on the identification of the user 102A as an adult male. For example, advertisements to be presented to the user 102A identified as an adult male may exclude advertisements directed to women's apparel.

In some embodiments, the user account management module 248 may disable and/or enable certain features based at least in part on the identification of a user 102A based on their biometric identifiers 218. For example, if a user 102A is identified to be a child, the user account management module 248 may disable purchasing capabilities. If the user 102A is identified to be an adult, the user account management module 248 may enable purchasing capabilities.

In some embodiments, the recommendation module 250 may generate recommendations or other secondary content based at least in part on the request. In some embodiments, the recommendations module 250 may receive a viewing history or purchase history associated with the first user 102A from the user device 104 and/or information retrieved from the user account. The recommendation module 250 may analyze the received viewing history or the received purchase history and identify one or more behavior patterns based at least in part on the analyzed viewing history or the analyzed purchase history. In some embodiments, the recommendations module 250 may compare the one or more behavior patterns to data associated with a plurality of users and generate one or more recommendations for content based at least in part on the comparing of the one or more patterns with the plurality of users. In some embodiments, the recommendation module 250 may generate one or more recommendations for content or secondary content based at least in part on implicit identification information associated with a user 102A derived from the biometric identifiers 218 of the user. For example, the biometric module 246 may identify a user 102A as a child based on facial or voice recognition and may tailor recommendations based on the information derived from the biometric identifiers 218. In some embodiments, the recommendations module 250 may update the first user account based at least in part on the one or more behavior patterns or the one or more recommendations. In some embodiments, the recommendations generated by the recommendations module 250 may be transmitted with the requested content to the user device 104 for presentation to the user 102A.

At block 425, the user device 104 may provide the first user with the first data. In some embodiments, the user account management module 248 may transmit the results of the query to the user device 104 and the user device 104 may present the requested information to the user.

In some embodiments, once the biometric identifiers 218 of the first user 102A are identified, the data collection module 216 may capture behavioral information of the user 102A as they interact with the user device 104, such as a list of applications the user 102A interacts with, the duration of interaction of the user device 104 by the user 102A, a viewing or browsing history of the user 102A and/or a purchase history of the user 102A and store the information locally on the user device 104. The user device may periodically transmit the behavioral information of the user 102A to the server 108, where the information may be analyzed and behavior patterns associated with the user 102A may be identified and analyzed. The user account associated with the biometric identifiers 218 may be updated based at least in part on the behavior patterns identified by the server 108.

At block 430, second biometric identifiers associated with a second user of the user device 104 may be captured during an active session associated with the first user profile. In some embodiments, capturing the second biometric identifiers may be captured after capturing the first biometric identifier. Between the capturing of the first biometric identifier(s) and the second biometric identifier(s), the first user may not log out of the user device and the second user does not log into the user device. For example, a second user 102B, such as a friend or family member of the first user 102A, may pick up the user device 104 and start browsing an application and or otherwise interacting with the user device 104 without the first user 102A logging out or the second user 102B logging into the user device 104. The data collection module 216 of the user device 104 may capture biometric identifiers associated with the second user 102B during their interaction with the user device 104.

At block 435, the second user may be identified based at least in part on the second biometric identifier. The user device 104 may recognize that the captured biometric identifiers 218 do not match the biometric identifiers 218 associated with the first user 102A. In some embodiments, the user device 104 may need to capture the same type of biometric identifier 218 captured in association with the first user 102A to determine that the second user 102B is not the same as the first user 102A. For example, if the biometric identifier 218 captured in association with the first user 102A is a fingerprint, then it may be necessary to capture the fingerprint of the second user 102B to enable a direct comparison of the captured biometric identifiers 218 to ensure they are not associated with the same user 102. However, in some embodiments, the user device 104 may capture different types of biometric identifiers 218 and the system 200 may be able to identify the different users 102 based on the different types of biometric identifiers captured. In some embodiments, the user device 104 may log out of the user account associated with the first user 102A. In some embodiments, the user device 104 may capture the behavior patterns of the second user 102B and store them locally until they are removed. For example, the user device 104 may identify the second user 102B associated with a second user account based at least in part on the captured biometric identifiers associated with the second user 102B. For example, the user device 104 may compare the captured biometric identifiers 218 associated with the second user to locally stored biometric identifiers 218 that may have been captured and verified previously on the user device 104. In some embodiments, the user device 104 may be able to identify and/or authenticate that that second user 102B is associated with a second user account. In some embodiments, the biometric identifier information may not be available on the user device 104, and the user device 104 may transmit the captured biometric identifiers associated with the second user 102B to a server 108 for identification, verification, and/or authentication. If the server 108 (e.g., biometric module 246 and/or user account management module 248) determine that the second user 102B is associated with a second user account, information associated with the second user 102B may be retrieved. If the server 108 determines that the second user 102B is unknown to the system 200, then no recommendations and/or additional information may be retrieved and/or accessed.

At block 440, the user device 104 may transmit a second request for content from the second user 102B. At block 445, the user device 104 may receive a second data that corresponds to the second request for content. If the second user 102B is associated with a known second user account, similar to blocks 420 and 425, content may be retrieved based on the request as well as user account information. If the second user 102B is not associated with a known second user account, content may be retrieved based on the second request. In some embodiments, content may be retrieved based at least in part on behavioral information captured during the course of the usage of the user device 104 by the second user 102B. For example, if the second user 102B perused applications and/or requested content using Spanish, then the content retrieved may be in Spanish.

At block 450, the user device 104 may provide the second user 102B with the second data. In some embodiments, if the second user 102B is not known to the system 200, the user device 104 may ask the user whether they would like to create a user account. If the user indicates that they would like to create a new user account, the biometric identifiers and behavioral information captured by the user device 104 may be transmitted to the server 108 and associated with the new user account generated and associated with the second user 102B. If the user 102B decides not to create a new account, the biometric identifiers 218 and capture behavioral information may be discarded by the user device 104.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
    capturing a biometric identifier with a user device;
    identifying a user profile based at least in part on comparing the biometric identifier with a previously stored biometric identifier, wherein the previously stored biometric identifier is associated with the user profile;
    authenticating the user profile by confirming the biometric identifier matches the previously stored biometric identifier;
    determining the first biometric identifier indicates an age of a user, the age being less than a threshold age;
    receiving customized data, wherein the customized data is based on the age of the user, and further based on a comparison of user behavior information to behavior patterns in data associated with other users; and
    displaying the customized data.

2. The non-transitory computer-readable medium of claim 1, wherein the biometric identifier comprises at least one of a fingerprint, a voice recording, or an image of a face of the user.

3. The non-transitory computer-readable medium of claim 1 with additional computer-executable instructions to cause the processor to perform operations further comprising:
    transmitting a request for data to a server, wherein the request comprises the biometric identifier, and wherein the customized data is received from the server.

4. A computer-implemented method comprising:
    capturing, by a user device comprising one or more computer processors, a first biometric identifier with the user device;
    determining, by the user device through comparing the first biometric identifier with a previously stored biometric identifier, that the first biometric identifier is associated with a first user profile;
    authenticating the first user profile by confirming the biometric identifier matches the previously stored biometric identifier;
    determining the first biometric identifier indicates a first age of a first user, the first age being less than a threshold age;
    transmitting, by the user device, a first request to a server, wherein the request comprises the first biometric identifier associated with the first user profile; and
    receiving, by the user device, in response to the first request, first customized data based at least in part on the first age of the first user and a comparison of the user behavior information to behavior patterns in data associated with other users.

5. The computer-implemented method of claim 4, wherein the first biometric identifier comprises at least one of a fingerprint, a voice recording, or an image of a face.

6. The computer-implemented method of claim 4, further comprising:
    capturing, by the user device, a second biometric identifier, wherein the second biometric identifier is compared with the previously stored biometric identifier;
    determining, by the user device, that the second biometric identifier is not associated with the first user profile;
    transmitting, by the user device, a second request to the server;
    determining that the second biometric identifier is associated with a second user profile;
    determining the second biometric identifier indicates a second age of a second user, the second age being less than the threshold age; and
    receiving, by the user device, in response to the second request, second customized data based at least in part on the second age of the second user and the second biometric identifier.

7. The computer-implemented method of claim 6, wherein the second request further comprises the first biometric identifier.

8. The computer-implemented method of claim 6, wherein the first user profile comprises demographic information.

9. The computer-implemented method of claim 6, further comprising:
    determining that the second biometric identifier is not associated with any user profile;
    generating a second user profile; and
    associating the second biometric identifier with the second user profile.

10. The computer-implemented method of claim 6, wherein the second biometric identifier is captured during an active session with the user device.

11. The computer-implemented method of claim 10, wherein:
    capturing the second biometric identifier occurs after capturing the first biometric identifier, wherein between the capturing of the first biometric identifier and the capturing of the second biometric identifier, no log out or log in of the user device occurs.

12. The computer-implemented method of claim 11, further comprising:
updating, by the server, the first user profile based at least in part on the first request or the first data.

13. A system comprising:
at least one memory storing computer-executable instructions; and
at least one processor, wherein the at least one processor is configured to access the at least one memory and to execute the computer-executable instructions to:
capture a first biometric identifier with a user device;
determine through comparing the first biometric identifier with a previously stored biometric identifier that the first biometric identifier is associated with a first user profile;
authenticate the first user profile by confirming the first biometric identifier matches the previously stored biometric identifier;
determine the first biometric identifier indicates a first age of a first user, the first age being less than a threshold age;
transmit, to a server, a first request comprising the first biometric identifier; and
receive first customized data, wherein the first customized data is based on the first age of the first user, and further based on a comparison of user behavior information to behavior patterns in data associated with other users.

14. The system of claim 13, wherein the first biometric identifier comprises at least one of a fingerprint, a voice recording, or an image of a face.

15. The system of claim 13, wherein the at least one processor is further configured to execute the computer-executable instructions to:
capture a second biometric identifier, wherein the second biometric identifier is compared with the previously stored biometric identifier;
determine the second biometric identifier is not associated with any user profile;
generate a second user profile;
associate the second biometric identifier with the second user profile;
determine the second biometric identifier indicates a second age of a second user, the second age being less than the threshold age;
transmit a second request to the server; and
receive second customized data based at least in part on the second age of the second user and the biometric identifier.

16. The system of claim 15, wherein the second biometric identifier is captured during an active session with the user device.

17. The system of claim 16, wherein:
the computer-executable instructions to capture the second biometric further comprise computer-executable instructions to capture the second biometric identifier after capturing the first biometric identifier, wherein between the capturing of the first biometric identifier and the capturing of the second biometric identifier, no log out or log in of the user device occurs.

18. The system of claim 17, wherein the at least one processor is further configured to execute the computer-executable instructions to:
update the first user profile based at least in part on the first request or the first customized data.

* * * * *